United States Patent [19]

Delbridge

[11] 4,328,973
[45] May 11, 1982

[54] SHAFT SEAL WITH FLUID PRESSURE AND SPRING BIAS

[75] Inventor: Albert J. Delbridge, Louisville, Ky.

[73] Assignee: E. I. Du Pont de Nemours and Company, Wilmington, Del.

[21] Appl. No.: 141,123

[22] Filed: Apr. 17, 1980

[51] Int. Cl.³ ..................... F16J 15/38; F16J 15/48
[52] U.S. Cl. ........................... 277/3; 277/27; 277/65; 277/71; 277/85
[58] Field of Search .................. 277/38-41, 277/59, 65, 82, 85, 87, 93 R, 93 SD, 3, 27, 71, 72 R, 75, 79

[56] References Cited

U.S. PATENT DOCUMENTS

| 1,798,158 | 3/1931 | Hazard | 277/71 |
|---|---|---|---|
| 2,296,542 | 9/1942 | Steen | 277/3 X |
| 2,444,713 | 7/1948 | Solari | 277/40 |
| 2,818,284 | 12/1957 | Stevens | 277/65 |
| 3,037,458 | 6/1962 | Olmstead et al. | 277/65 X |
| 3,168,871 | 2/1965 | Sieghartner | 277/65 X |
| 3,176,996 | 4/1965 | Barnett | 277/3 X |
| 3,198,530 | 8/1965 | Conklin | 277/85 |
| 3,213,798 | 10/1965 | Carswell | 277/59 X |
| 3,403,595 | 10/1968 | Watson | . |
| 3,472,522 | 10/1969 | Winfrey | 277/41 |
| 3,646,846 | 3/1972 | Houghton et al. | . |
| 3,834,715 | 9/1974 | Butler | 277/75 X |
| 4,168,936 | 9/1979 | Scheller et al. | 277/27 X |

FOREIGN PATENT DOCUMENTS

| 726899 | 2/1966 | Canada | 277/27 |
|---|---|---|---|
| 648384 | 1/1951 | United Kingdom | 277/65 |

OTHER PUBLICATIONS

Ramsden, J. H., "How to Choose and Install Mechanical Seals", Chemical Engineering, Oct. 9, 1978, pp. 97-102.
Hoyle, R., "How to Select and Use Mechanical Packings", Chemical Engineering, Oct. 9, 1978, pp. 103-110.
John Crane, Bulletin No. S-243-2, Section XII (no date).
Durametallic Corporation, Dura Seal Manual, pp. 59 and 60, (no date).
John Crane, Bulletin No. S-2021, pp. 1-12 (no date).

Primary Examiner—Robert S. Ward, Jr.

[57] ABSTRACT

A novel shaft seal suitable for use on agitator shafts and pump shafts such as those commonly found in industrial chemical process equipment, said seal comprising a conventional mechanical seal in combination with packing of a particular material of construction, configuration and which is held under substantially constant compression, such that when fluid is provided under pressure into a stuffing box containing such packing, the fluid will flow through the packing into the process stream with sufficient velocity to prevent process fluid from flowing back into the stuffing box, and yet with insufficient volume rate of flow to cause significant dilution of the process fluid.

6 Claims, 2 Drawing Figures

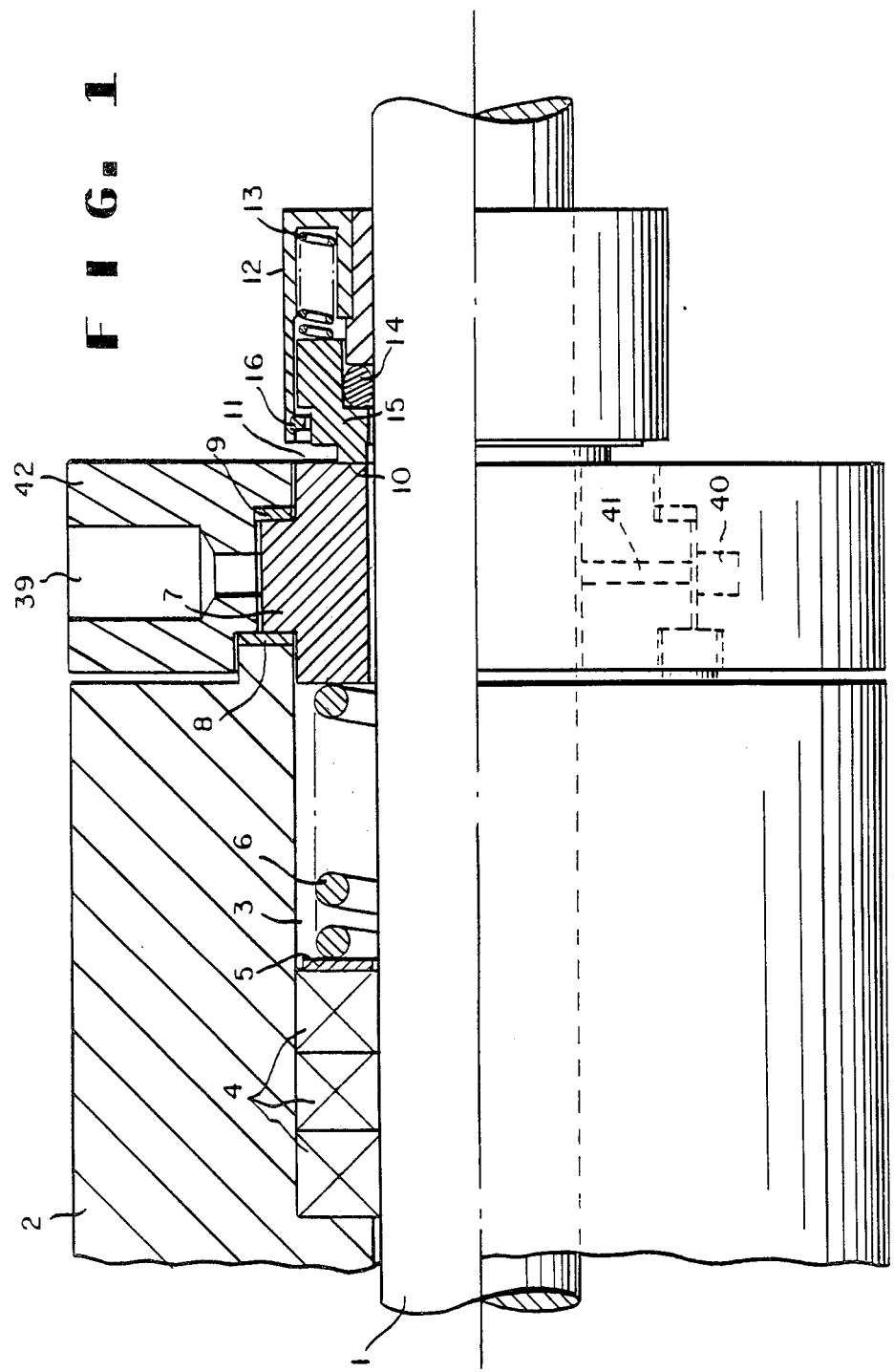

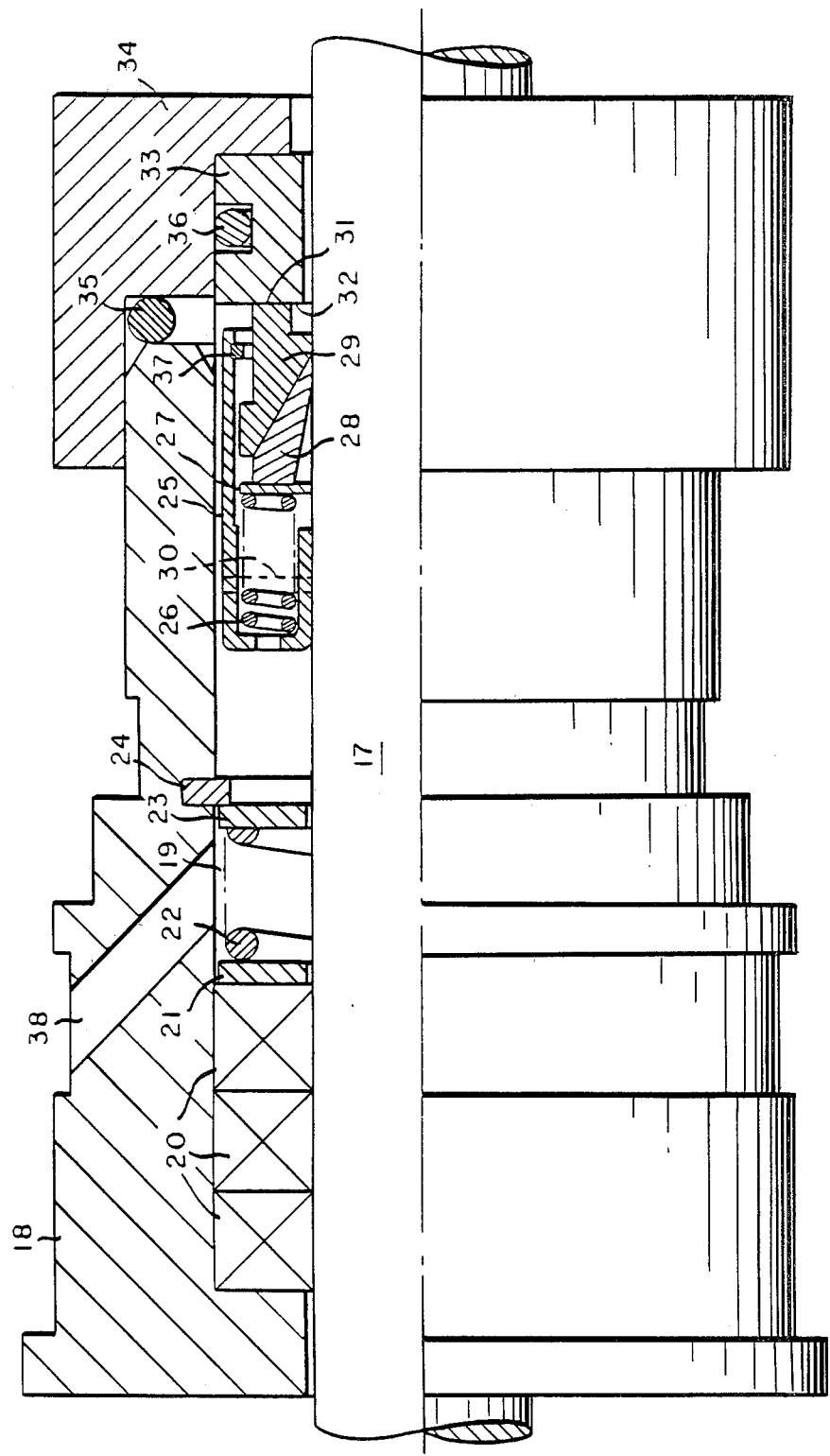

SHAFT SEAL WITH FLUID PRESSURE AND SPRING BIAS

DESCRIPTION

1. Technical Field

This invention relates to shaft seals, suitable for use on agitator shafts and on pump shafts. Agitation vessels and pumps are commonly used, for example, in industrial chemical process equipment. It is important in the use of such equipment, both for economic and environmental reasons, to minimize or eliminate leakage of the chemical process fluid from the process equipment. In particular, the present invention relates to an improved shaft seal particularly well suited for use with process fluids which are toxic or environmentally unacceptable or which are corrosive, abrasive and/or contain coagulant.

2. Background Art

Shaft seals have been made in a wide variety of configurations and of a wide variety of materials of construction. For example, a conventional mechanical seal generally comprises a primary ring in intimate contact with a mating ring, wherein the primary ring is generally sealed to the shaft, and the mating ring is generally sealed to the housing, and the area of intimate contact comprises a pair of matched highly polished faces. A typical mechanical seal is shown in cutaway on page 3 of John Crane Bulletin S-205-13, Type 9 shaft Seal (Crane Packing Company, Morton Grove, Illinois). Depending on the intended service, the materials of construction can be varied. For use with corrosive fluids, it is common to use a primary ring of carbon and a mating ring of an impervious alloy or a chemically inert ceramic. However, even with these materials of construction, the polished faces will become scored in a very short time when the process fluid is abrasive or contains coagulant. As the faces become scored, the seal becomes ineffective and fluid will leak between the faces and out along the shaft.

A packed stuffing box is another example of a conventional shaft seal. Generally, the packing is sufficiently compressed to limit the passage of fluid through the packing, but hopefully not so compressed as to create excess friction between the packing and the shaft. Pressure is generally maintained on the packing by manually tightening the gland on the stuffing box until the point where leakage through the packing is minimized yet before the point where friction between the packing and the shaft creates overheating of the packing. Such a configuration operates on the principle of controlled leakage to the atmosphere rather than zero leakage. However, this requires frequent adjustment, and overtightening will result in excess friction and heat buildup, excessive wear to the packing, and possibly even damage to the shaft. Even when the pressure on the packing is properly regulated, the pressure necessary to minimize the passage of fluid through the packing will necessarily cause relatively high friction between the packing and the shaft, the packing will wear out and require replacement frequently. Furthermore, applications of such embodiments are limited to shafts operating at low RPM's, and to process fluids that are non-abrasive. Otherwise, the useful life of the packing becomes so short as to render it almost useless.

A packed stuffing box can incorporate a means for flushing a fluid through the packing. In such an embodiment, there is generally a plurality of layers of packing on each side of a lantern ring. An injection port in the stuffing box must line up with the lantern ring to insure the passage of flush fluid to the shaft. The compression of the packing in such a configuration is accomplished by manually tightening a gland at the outboard end of the stuffing box. The compression profile that is generated by the tightening of said gland shows 80% of the compression occurring in the 2 rings adjacent to the gland and the remaining 20% of the compression occurring in diminishing amounts in each ring up to the lantern ring. The layers on the inboard side of the lantern ring receive little or no compression. This results in a relatively uncontrolled flow of flush fluid into the process and the significant risk of back flow of process fluid into the stuffing box.

Still another example of a conventional shaft seal is a combination of either a mechanical seal or packing with a throttle bushing or a throat bushing. The configuration of a throttle bushing is generally such that the bushing is press fit into a stuffing box at the process stream end, providing a relatively small annular passage between the bushing and the shaft. Also within the stuffing box is provided a conventional mechanical seal or packing and an entry into the stuffing box where fluid can be applied under pressure, thus forcing fluid through the throttle bushing and into the process stream. In fluid flows through the bushing with a sufficient flow rate, it will prevent back flow of the process fluid into the stuffing box and contact of the process fluid with the mechanical seal. Typical configurations of this type are shown in John Crane Bulletin No. S-243-2, Section XII, page 1 or the Durametallic Corporation Dura Seal Manual, page 59. Such configurations are specifically designed for use with abrasive process fluids, but they result in the injection of so much flush fluid into the process stream that they are totally unsuitable with any process which demands minimal dilution.

A recent discussion of various shaft seal arrangements is provided in the Oct. 9, 1978 issue of Chemical Engineering Magazine, at page 96 in an article by J. H. Ramsden. In that article, there is discussed the use of throat bushings and the requisite flow rate of flush fluid as being on the order of gallons per minute. Even though flow rates can be minimized by using a floating throat bushing with a smaller radial clearance, the rate of flow remains at the same general order of magnitude. For many chemical processes, dilution at this rate is simply not suitable. In those instances throat bushings are not used and leaking pumps are simply accepted.

DISCLOSURE OF THE INVENTION

The present invention comprises a novel shaft seal suitable for use on agitator shafts or pump shafts, and is particularly well suited where the process fluid is toxic or environmentally unacceptable or where the process fluid is corrosive, abrasive and/or contains coagulant, and also where the process is such that significant dilution of the process fluid cannot be tolerated.

The novel shaft seal of the present invention comprises a conventional mechanical seal in combination with packing such that when fluid is provided under pressure to a stuffing box containing said packing, the fluid will flow through the packing into the process stream with sufficient velocity to prevent process fluid from flowing back into the stuffing box and contacting the mechanical seal and yet with insufficient volume rate of flow to cause significant dilution of the process fluid.

Naturally, in the seal of the present invention, the packing is located along the shaft being sealed at a position closer to the process stream than the mechanical seal, and the stuffing box is provided with a means for injecting fluid under pressure into the stuffing box.

The packing can be of any configuration and any material of construction that will provide the requisite effective void cross-section, i.e., the packing must be sufficiently porous that fluid under pressure will pass therethrough, and also such that the effective cross-section of the void spaces therein is sufficiently small so that only a relatively low volume rate of flow of fluid therethrough will be required to achieve a relatively high velocity of flow therethrough. The packing can be used in one or more layers juxtaposed to one another along the length of the shaft closest to the process stream, the number of layers of packing depending on the material of construction of the packing, the configuration of the packing, the compression under which the packing is maintained, the pressure difference between the stuffing box and the process stream, and other similar variables. If more than one layer of packing is used, each layer can be the same or different from the other layers.

For use in medium to high speed pumps where the process stream is abrasive and/or contains coagulant and the process pressure can be as high as 1000 psi, the most reliable seal is achieved with three layers of packing where the first and third layers are square cross-section braided graphite fiber packing, such as John Crane 1625 GF, and the second, or middle, layer of packing is square cross-section liquid graphite impregnated asbestos fiber packing, or where all three layers are braided graphite fiber such as 1625 GF. Unless the pump is subjected to process fluids at very high temperatures, the first above-mentioned embodiment is preferred. Where high temperatures are anticipated, the use of impregnated asbestos should be avoided. Similar packing materials are shown in U.S. Pat. Nos. 3,403,595 and 3,646,846.

As mentioned above, under certain circumstances, it is possible to use a single layer of packing. In fact, although the embodiment with three layers has been found to be most suitable in the widest variety of applications, it is preferred to use the smallest number of layers necessary to achieve the appropriate flow properties. This is so because the packing is maintained under compression, and as the number of layers of packing increases, it becomes increasingly difficult to achieve uniform compression throughout each of the layers. In fact, it has been found in conventional packed stuffing boxes that 80% of the compression occurs in the two layers immediately adjacent to the means for exerting the compressive force. As important aspect of the present invention is to locate the compressed packing as close to the process stream end of the shaft as possible.

Suitable packing materials, other than those mentioned above as preferred, include commercially available packing materials such as Teflon ® TFE-Fluorocarbon Resin/graphite combinations, carbon ribbon, and braided Kevlar ® aramid fiber. Teflon ® coated asbestos packing has proven particularly useful for use where a "steady-bearing" effect is desirable.

The packing will be positioned within the stuffing box flush with the base of the stuffing box adjacent to the process stream end of the shaft and will be held in position by a washer or some other physical means that will distribute the compressive force being applied to the packing evenly across the annular face of the packing furthest away from the process stream. When compressed, the packing will fill and fit snugly within the annular space between the shaft and the interior wall of the stuffing box, making intimate contact with both the shaft and the interior wall of the stuffing box. The washer, or other physical means, is of such dimension that it makes physical contact with neither the shaft nor the interior wall of the stuffing box.

A compressive force is conveniently applied to the washer, and in turn to the packing, by means of a coil spring which is concentric with the shaft, and is of such dimensions that it contacts neither the shaft nor the interior wall of the stuffing box. Alternatively, the compressive force can be applied by means of a plurality of springs, corrugated washers or any other means that will apply a uniform compressive force to the packing. The compressive force should be approximately 10–100 pounds (4.54–45.4 kilograms) depending on the size of the shaft and the particular packing chosen. For example, for the preferred packing discussed above and a 1 inch diameter shaft, the compressive force should be about 10–20 pounds (4.54–9.08 kilograms). For a three inch diameter shaft, the compressive force is preferably 30–50 pounds (13.62–22.7 kilograms). Larger shafts (e.g., $3\frac{3}{8}$ inch and $4\frac{1}{8}$ inch) have been successfully fitted with the present invention where the packing is compressed at above 60–80 pounds (27.24–36.32 kilograms). The material of construction of the washer and the spring can be varied, provided they are not reactive with the fluid provided into the stuffing box. Stainless steel is preferred.

The coil spring can be held in place either by a washer and a stop within the stuffing box or by the back end of the stationary seat of the mechanical seal, depending on whether the rotary member of the mechanical seal is inside or outside mounted, or by any other convenient equivalent means.

The mechanical seal is preferably one of conventional configuration and materials of construction. The mechanical seal comprises a rotary member and a stationary member. The rotary member comprises a cage which is fixed to the shaft by means of one or more set screws but maintains a small clearance with respect to the inside wall of the stuffing box. Within the cage are a plurality of springs pushing against a rotary washer with a force of approximately 25 p.s.i. (about 172 kPa). The rotary washer can be made of tungsten carbide, carbon or any other durable material capable of being ground and polished to a flat, smooth surface and which is not reactive with the fluid within the stuffing box. The stationary member comprises a stationary seat which is fixed to the stuffing box, generally by means of gaskets or O-rings, and which maintains a small clearance with respect to the shaft. The stationary seat provides a mating face with which the face of the rotary washer makes intimate contact and provides the mechanical seal. The stationary seat may be made of a material the same or different from that of the rotary washer, and may be, e.g., carbon, steel, ceramic, or various alloys.

The fluid provided under pressure to the stuffing box can be any fluid that is clean, i.e., free of any dissolved or suspended solids, inexpensive, non-contaminating to the process or to the environment, and possesses some lubricating properties. Examples of suitable fluids include water, oil, kerosene, and water/glycerine combinations. Process pressure can be as high as 1000 p.s.i. Pressure within the stuffing box must be greater than the process pressure and sufficiently greater so as to provide the requisite flow therethrough and into the process stream. Although the requisite linear velocity through the packing is not precisely determined, it is believed that it should be at least 6 ft. (1.83 meters)/sec. and preferably should be closer to about 10-15 ft. (3.05-4.57 meters)/sec. as a minimum. With the seal of the present invention, such a linear velocity can be achieved with a volume rate of flow less than one gallon per hour, and as low as 0.1 gallon per hour.

Where the process stream contains an abrasive fluid, conventional mechanical seals or conventional packed stuffing boxes, such as are disclosed in the prior art, have failed consistently within a matter of weeks. The seals of the present invention will experience a useful service life under similar conditions of a year or more.

BRIEF DESCRIPTION OF THE DRAWINGS

FIG. 1 shows one embodiment of the seal of the present invention where the rotary member of the mechanical seal is mounted external with respect to the stuffing box.

FIG. 2 shows another embodiment where the rotary member of the mechanical seal is internal.

DESCRIPTION OF THE PREFERRED EMBODIMENTS

FIG. 1 shows a one-half cutaway of one embodiment of the seal of the present invention where the rotary member of the mechanical seal is mounted external with respect to the stuffing box. The shaft is shown at 1 with the process stream end of the shaft to the left of the drawing and the driven end to the right. The stuffing box is shown at 2, with a cavity within the stuffing box shown at 3. Within that cavity have been placed three layers of packing, 4, a flat washer, 5, and coil spring, 6. The coil spring is held in place by the stationary ring, 7, which forms a leak-tight configuration with the stuffing box by means of gasket, 8. The face, 10, of the rotary washer, 15, is pressed into intimate contact with the matched face, 11, of the stationary member, 7, by means of coil springs, 13, within the rotary member or cage, 12. The rotary member is secured to the shaft by means of set screws not shown, and the passage of fluid thereby is prevented by the meeting of lapped faces, 10 and 11, and the O-ring, 14. Snap ring, 16, secures the rotary washer in place. Flush port, 39, provides means to pass a fluid into the stuffing box under pressure. Drilled hole, 41, in the stationary seat, 7, is located 180° from the flush port, 39, to insure flow of fluid around the entire periphery of the stationary seat, 7, through cavity, 40, in gland, 42. This configuration facillitates cooling of the stationary seat, even with the minimized flow of flush fluid into the process.

FIG. 2 shows a one-half cutway of another embodiment of the seal of the present invention where the rotary member of the mechanical seal is mounted internal with respect to the stuffing box. This embodiment comprises a very similar configuration with a shaft, 17, stuffing box, 18, stuffing box cavity, 19, three layers of packing, 20, a washer, 21, a coil spring, 22, a washer, 23, and a snap ring, 24, holding the washer, 23, in place. The mechanical seal is mounted internally and comprises the rotary member or cage, 25, with a plurality of coil springs, 26, therein pushing against a disc, 27, and, in turn against a wedge, 28, and the rotary washer, 29. The rotary member is secured to the cage by means of set screws, 30, and passage of fluid between the rotary member and the shaft is prevented by the wedge, 28. The face, 31, of the rotary washer, 29, makes intimate contact with the matching face, 32, of the stationary member, 33, which is fit within the gland plate, 34. Passage of fluid between the gland plate, 34, and the stuffing box, 18, and between the gland plate, 34, and the stationary member, 33, is prevented by O-rings, 35 and 36, respectively. Snap ring, 37, secures the rotary washer in place. Flush port, 38, provides means to pass a fluid into the stuffing box.

INDUSTRIAL APPLICABILITY

The shaft seal of the present invention is useful with pumps used in industrial chemical processes, particularly where the process stream comprises fluids which are toxic or environmentally unacceptable or which are corrosive, abrasive and/or contain coagulant. For example, in the manufacture of polychloroprene, the following materials have been successfully handled with the shaft seals of this invention: emulsions of monomer (2-chlorobutadiene-1,3) and up to 10 pph of various comonomers which may include 2,3-dichlorobutadiene-1,3, methacrylic acid, sulfur, and acrylonitrile, emulsifying agents such as Nancy Wood rosin, disproportionated tall oil rosins and a sodium salt of a condensation product of naphthalene sulfonic acid and fomaldehyde, and transfer agents such as dodecyl mercaptan; and emulsions of polymers prepared from such monomer emulsions either before or after removal of unreacted monomers. Polymer emulsions which may be pH adjusted with NaOH will contain minor amounts of other materials such as residues of initiating agents (potassium persulfate and sodium sulfite), short-stopping ingredients, peptizers, stabilizers, and additional emulsifying agents. All of these emulsions contain coagulant in variable amounts which can prevent sealing if it intrudes into the stuffing box. In addition, coagulum would be formed from the emulsion itself if it is subjected to the shearing forces within most types of seals.

BEST MODE

Although the best mode of the present invention will depend upon the particular process fluid being handled, whether the fluid is being pumped or agitated, the size and speed of rotation of the pump, the temperature and pressure of the process stream, and the space between the drive means and the stuffing box, generally the most preferred embodiment of the present invention is that of FIG. 1 wherein the layers of packing include two layers of square cross-section braided graphite fiber packing separated by a layer of square cross-section liquid graphite impregnated asbestos packing, wherein the rotary washer is carbon and the stationary seat is ceramic.

I claim:

1. A shaft seal comprising a mechanical seal in combination with packing which is maintained under substantially constant compression within an annular space formed by the shaft and the interior wall of a stuffing box mounted concentrically with respect to said shaft, said packing being located within said annular space at a position along the shaft closest to the process stream end of the shaft, said mechanical seal being located at a position along the shaft further away from the process stream end of the shaft than the packing thereby forming an annular cavity bounded by the shaft, the interior wall of the stuffing box, the packing and the mechanical seal, a means for providing a fluid under pressure to said cavity, the material of construction, configuration and compression to the packing being such that when said fluid is provided to said cavity under pressure greater than the pressure of the process stream, the fluid will flow through the packing into the process stream with sufficient velocity to prevent process fluid from entering the stuffing box and with insufficient volume rate of flow to cause significant dilution of the process fluid, wherein the packing is maintained under substantially constant compression by means of at least one coil spring exerting a force thereon of approximately 10–100 pounds.

2. The shaft seal of claim 1 wherein the packing comprises three layers, the center layer being square cross-section liquid graphite impregnated asbestos packing, the other two layers being square cross-section braided graphite fiber packing.

3. The shaft seal of claim 1 wherein the rotary member of the mechanical seal is mounted on the shaft external with respect to the stuffing box.

4. The shaft seal of claim 1 wherein the construction, configuration and compression of the packing is such that the velocity of fluid flowing therethrough into the process stream is at least 6 feet per second while the volume rate of flow of said fluid is not greater than one gallon per hour.

5. A method of sealing a shaft comprising mounting on the shaft the seal of claim 1 and then providing fluid to said cavity at a pressure greater than the pressure of the process stream.

6. The shaft seal of claim 1 wherein the rotary member of the mechanical seal is mounted on the shaft internal with respect to the stuffing box.

* * * * *